United States Patent [19]

Condolios et al.

[11] 3,849,310
[45] Nov. 19, 1974

[54] METHOD AND APPARATUS FOR SEPARATING PARTICLES FROM A LIQUID

[75] Inventors: Elie Condolios, Grenoble, France; Uilke Van Essen, Gorinchem, Netherlands

[73] Assignees: N.V. Technical Maatschappij Bergmann, Berkel en Roodenrijs, Netherlands; Societe Grenobloise D'Etudes et D'Applications Hydrauliques (Sogreah), both of Grenoble-Gare, Netherlands

[22] Filed: Jan. 12, 1972

[21] Appl. No.: 217,106

[30] Foreign Application Priority Data
Jan. 14, 1971  France .............................. 71.01869
Mar. 25, 1971  France .............................. 71.11405

[52] U.S. Cl................. 210/196, 210/220, 210/512, 210/520, 210/534
[51] Int. Cl.......................................... B01d 21/26
[58] Field of Search ............. 210/84, 196, 220, 322, 210/519, 520, 521, 534, 512

[56] References Cited
UNITED STATES PATENTS
2,777,581  1/1957  Unthank ............................ 210/519
2,787,378  5/1957  Battey................................ 210/520
3,517,814  6/1970  Minegishi........................ 210/519 X
3,615,025  10/1971  Rice et al........................... 210/521

Primary Examiner—Frank A. Spear, Jr.
Assistant Examiner—F. F. Calvetti
Attorney, Agent, or Firm—Edmund M. Jaskiewicz

[57] ABSTRACT

Method and apparatus for the separation of particles from a liquid, comprising a basin with a central feed of the mixture of liquid and particles, the outflow being directed outwardly and horizontally thereby creating a centrifugal flow towards the periphery of the basin, upon which flow a velocity component in tangential direction is imparted thus producing a horizontal vortex field.

9 Claims, 7 Drawing Figures

3,849,310

METHOD AND APPARATUS FOR SEPARATING PARTICLES FROM A LIQUID

BACKGROUND OF THE INVENTION

The invention relates to a method for separating particles from a liquid, according to which method the mixture of liquid and particles are introduced into a basin and a substantially horizontal flow is produced in the basin, said flow being in the direction of an overflow edge for the lighter fraction, while the heavier fraction is discharged in the bottom of the basin. Such a method is commonly known for treating both dredged products and industrial liquids. The word "particles" in this text indicates solid material as well as liquid materials; in the latter case the mixture consists of two immiscible liquids.

It is often strived for in industrial plants before treating a mixture of solids and liquids, to separate the greater part of the conveying liquid from the solids which are carried along. This separation is realized either by an accelerated sedimentation and/or sedimentation by means of the force of gravity; or by separating the solids into two fractions, whereby the fine or light particles are carried along with the conveying liquid while the heavy or large particles are concentrated in a minimal quantity of conveying liquids.

In case that the presence of fine particles in the coarse particles is harmful for the industrial requirements, the separation and removal of the fine parts from the coarse fraction is in general called the washing of the coarse material to be recovered.

SUMMARY OF THE INVENTION

It is a first object of the invention to provide a method which produces in an efficient way the separation aimed at. This object is attained according to the invention by supplying the mixture centrally to a cylindrical basin and by causing the mixture to flow out in a radial direction, whilst imparting a component of velocity in tangential direction to the radially outward flowing liquid such, that a horizontal vortex field is produced. In this manner a disc-shaped area is created in which a separation of the particles can be produced.

Preferably the method consists in that at least a part of the radially horizontal outward flow is deflected in an upward direction through almost 180° outward and is radially inwardly returned to an area in the centre of the basin, situated above the inlet of the mixture, a part of the radially inward flow constituting a ring of a vertically descending liquid, whereas the lighter part of this radially inward flow follows an upward course in the direction of the overflow edge so as to finally flowing over. This flow pattern constitutes a three-dimensional field of flow with an improvement in the degree of separation.

It is a further object of the invention to provide an apparatus for performing the method indicated hereinbefore. This apparatus is distinguished in that the basin from top to bottom is composed of four parts disposed on each other.

The invention primarily aims to obtain the separation of solids from a liquid, but also the separation into two fractions of solids incorporated into liquid, the greater part of the liquid and the fine or light solids being removed by overflow at the upper end of the apparatus, while the coarse or heavy particles gather in the funnels from which they are discharged together with the remaining portion of the liquid.

In case the liquid carrying the solids which is introduced into the apparatus, consists of sea water, it is possible to admix fresh water in the apparatus in order to decrease the salt content of the solids to be discharged from the lower end of the apparatus.

The apparatus according to the invention can be disposed both as a stationary or a mobile plant on land, but may also be mounted on a floating unit.

It should be noted that the apparatus is also particularly adapted in the separation of a mixture of two liquids, e.g., an oil/water mixture. In that case, it is possible to add an auxiliary liquid to the mixture flowing into the basin. This auxiliary liquid may contain a substance which influences the consistency (e.g., the density) of one or more components of the mixture to be separated.

SURVEY OF THE DRAWINGS

Figure 1:
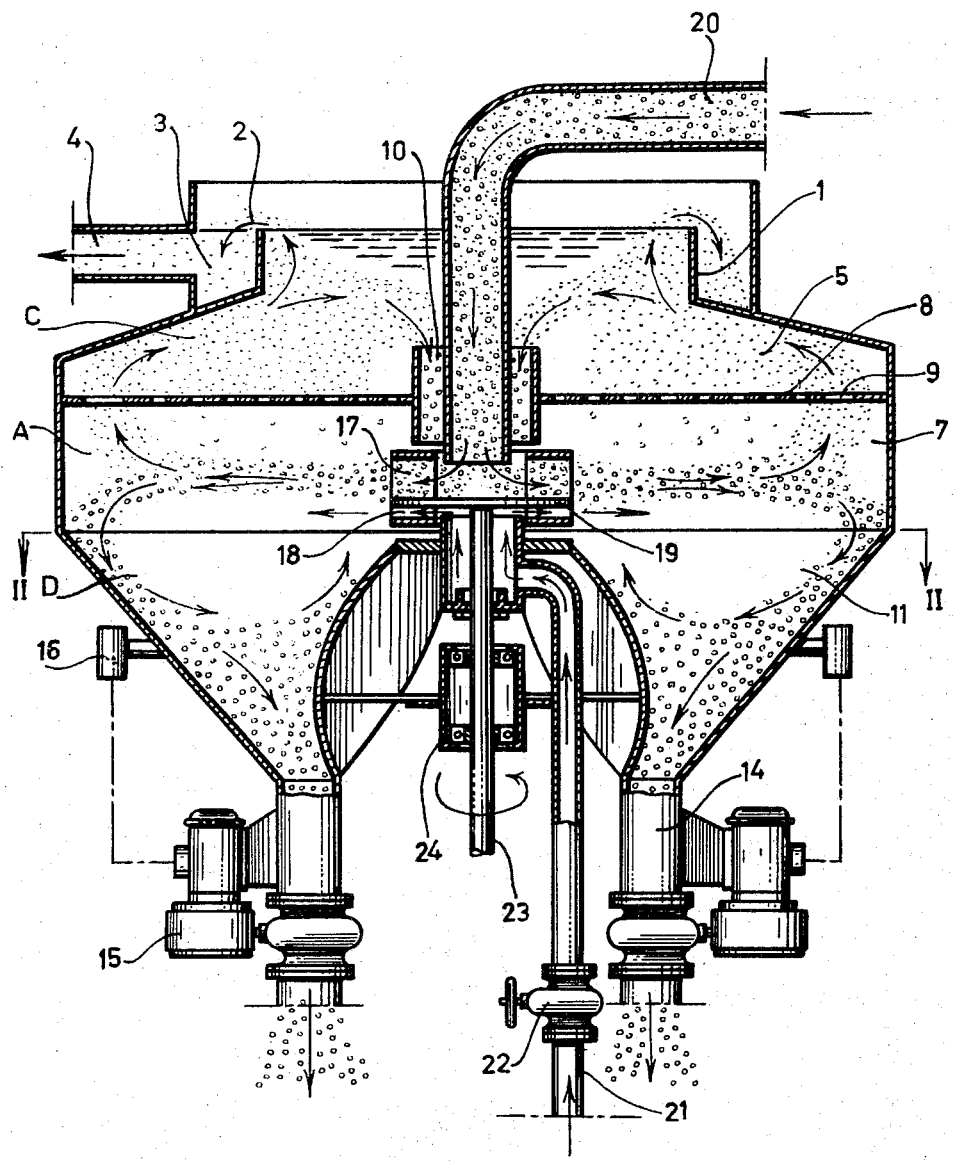
FIG. 1 is a vertical axial section through a first embodiment.
Figure 3:
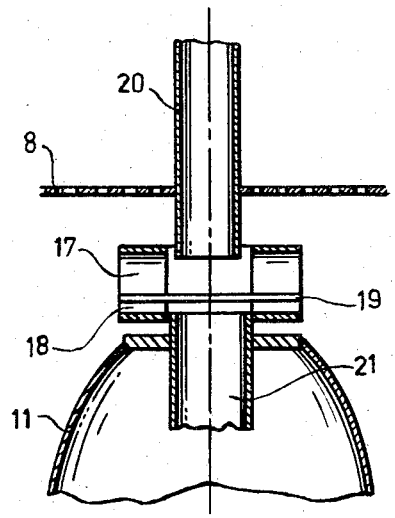
Figure 4:
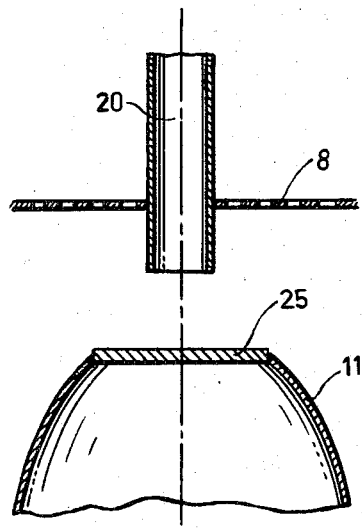

The FIGS. 3 and 4 show a variant of a detail of FIG. 1.

Figure 5:
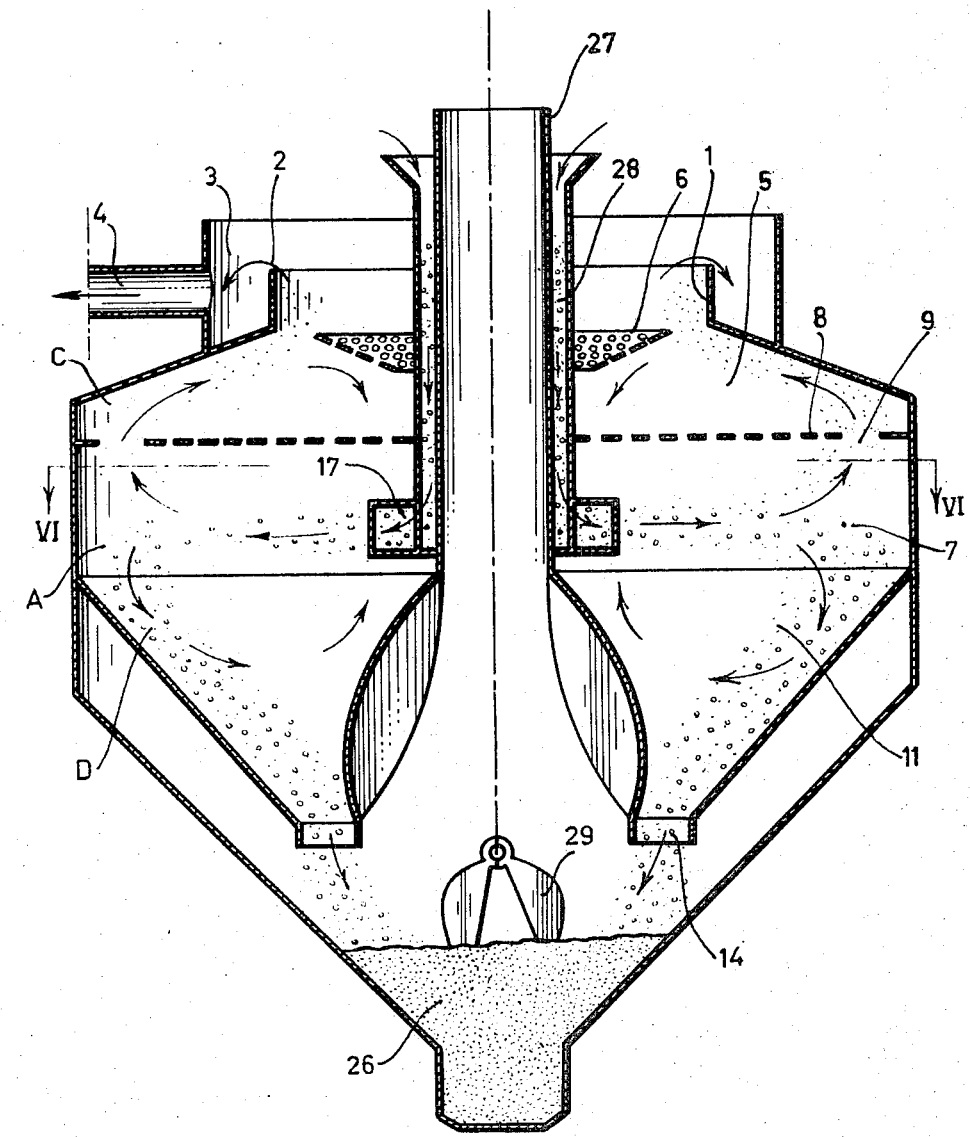

FIG. 5 shows a vertical axial section through another embodiment of the apparatus according to the invention.

Figure 6:
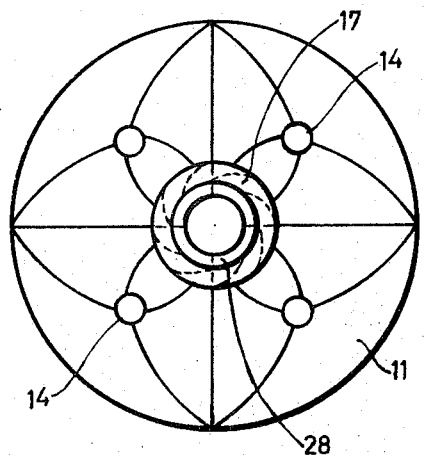

FIG. 6 is a horizontal section on a reduced scale, along the line VI—VI in FIG. 5.

Figure 7:
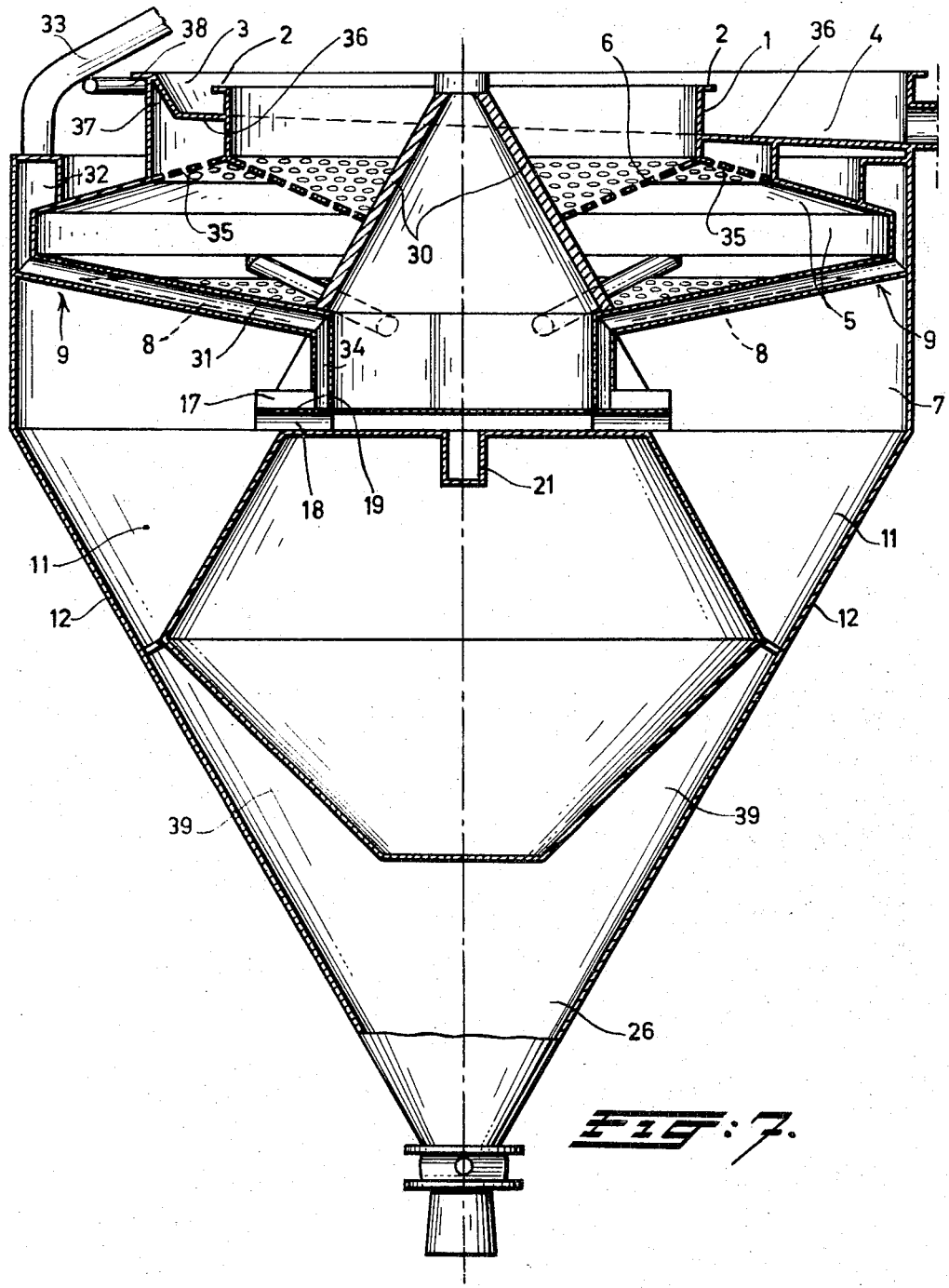

FIG. 7 shows a third embodiment in vertical section.

DESCRIPTION OF PREFERRED EMBODIMENTS

As is visible in FIG. 1 the apparatus consists of a basin comprising four main parts disposed on top of each other; viz., a cylindrical upper part 1 with an overflow edge 2, a gutter 3 and a discharge pipe 4.

Under this upper part 1 lies a conical part 5 which may contain a screen 6 (see FIGS. 5 and 7), either horizontal or placed at an angle. This second part 5 merges downwards into a cylindrical third part 7, containing a screen 8 either horizontal or disposed at an angle. The screen 8 is provided along its periphery with openings 9 having a greater diameter than the perforations. In the central part a sleeve 10 is mounted.

The lower part of the apparatus consists of four funnels 11 composed from a plate 12 forming the periphery and having the shape of a truncated cone. The funnels 11 further comprise mainly cylindrical plates 13a and a concave plate 13b, the latter being concentrical to the axis of the basin. Each funnel is further provided with a discharge passage 14 and an automatic valve 15 operated by a level controller 16. An upper blade wheel 17 and a lower blade wheel 18 are mounted on a horizontal disc or deflector 19 in the center of the part 7 of the apparatus. In the embodiment according to FIG. 1, the blade wheel 17-19 is rotatably.

The mixture to be treated is supplied through a pipe 20 in the center of the space 7 and in the middle of the blade wheel 17.

Clean liquid serving to wash the solid particles and optimizing their separation is supplied via a pipe 21 in the center of the space 7 notably in the central part of the blade wheel 18. This supply of clean liquid is regulated by a valve 22. The blade wheel 17, 18 is set into motion by the two liquids issuing from the pipes 20 and 21.

The apparatus operates as follows:

The material which should be washed, separated, inspissated or decanted enters the part 7 via the pipe 20 in the centre of the apparatus.

The flow of the material to be treated, which in the drawing is indicated by arrows, surrounded by dots, penetrates as far as the blade wheel 17. This wheel is shaped and/or arranged such that a centrally outwardly directed eddying motion is created, which continues in the entire part 7. This horizontal vortex field A is promoted by a rotating movement caused by the stream issuing from the pipe 21.

In some special cases the wheel 17, 18 is driven by means of a driving shaft 23 which is rotatably supported on bearings 24 to stimulate the eddying flow at an increased speed. The energy required to obtain an accelerated rotation of the wheel 17, 18 can be produced by a motor-variator aggregate.

Due to centrifugal force the vortex motion A throws the liquid with the solids coming from the blade wheel 17 towards the wall of the cylindrical part 7.

Simultaneously another vortex motion is produced by the other blade wheel 18. This rotating movement is maintained by clean liquid coming from the pipe 21. The vale 22 renders it possible to regulate the quantity of clean liquid which is injected into the part 7. The valve of rotation of the blade wheel 18 is identical to that of the blade wheel 17, since the two blade wheels are mounted on either sides of the deflector 19 upon the same shaft 23.

Under the vortex field A an eddying flow D is created such that the heavy or large solid parts which hereinafter will be called grains sag into this flow which is mainly moving in a vertical sense in the funnels 11. As will now be explained, the fine and/or light solid particles are for the greater part removed from the grains, so that the latter can settle in the funnels 11.

A portion of the vortex field A rotating horizontally in the part 7, changes its direction due to its contact with the inner sid of the peripheral wall of this part. The flow of said portion will be upwardly directed and passes through the openings of greater diameter 9 in the screen 8. This screen separates the parts 5 and 7. As a result a further eddying flow C is created which offers an important particularity due to its inward direction, this creating a complementary decantation of the grains taken along in the flow C. These grains will pass through the perforations of the screen 8 and/or through the sleeve 10 toward the part 7, from which part they can be again transferred to the funnels 11.

The flow of the vortex area C has a particular importance consisting in that it takes a shape which diverges toward the center. The velocity of the liquid does not increase, it decreases even. The heavy particles remain at the bottom of the diverging flow, whereby the passage of the particles through the perforations of the screen 8 is promoted. The screen 8 serves principally to allow the creation of two independent vortexes A and C, while the heavy particles are allowed to pass from the area C to the area A. An inclined position of the screen 8, as shown in FIG. 7, combined with the inclination in the opposite direction of the upper wall of the second part 5, promotes the divergence of the flow in the area C.

When the flow C arrives at the central area of the apparatus it is divided in two portions; one is upwards directed toward the overflow edge 2; while the other, which may yet contain grains, is sucked downwards through the sleeve 10 and returns to the part 7.

The liquid which flows off via the overflow 2 of part 1 and which is discharged by the gutter 3 and the pipe 4, contains in principle only fine and/or light parts to be removed.

Without limitation special arrangements can be made to increase the concentration of granular solids in the liquid which are discharged by the outlet passages 14 of the funnels 11. By applying level regulators 16 the valves 15 can be remotely controlled via a motor (not shown) so as to regulate the discharge capacity at the openings 14. In this manner it becomes possible to obtain concentrations of solids of 75 percent, which means 75 grams solids to 25 grams water.

On applying an apparatus having a cylindrical part 7 with a diameter of about 9 meters, and a central supply of the mixture amounting to about 3,600 m³/h, the radial outward velocity of flow of the mixture moving in the direction of the periphery of the part 7 will decrease from about 4 m/sec to about 0.2 m/sec. The quantity of mixture to be treated and the quantity of clean liquid may be in the ratio of 3:2 and 3:1. The quantity of clean liquid with respect to the total quantity of supplied liquid will amount to less than 40 percent.

Figure 2:
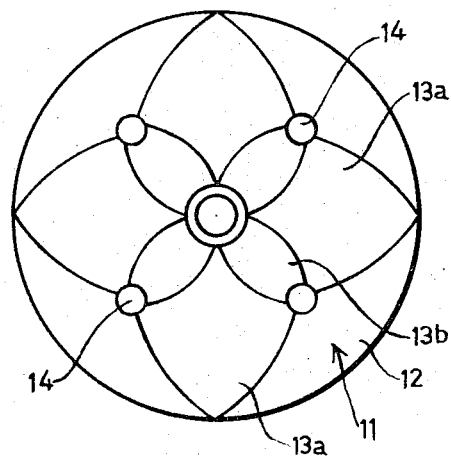
FIG. 2 is a horizontal section on a reduced scale along the line II—II in FIG. 1.

FIG. 2 shows the lower part of the apparatus with the four outlets 11 and their discharge passages 14.

FIG. 3 shows a modified embodiment of the invention, wherein the deflector, acting upon the flows coming from the pipes 20 and 21, is not formed by a wheel but by a stationary plate 19 of the same kind. This means that the plate 19 is also provided with vanes 17 on the upper side and vanes 18 on the underside, whereby a centrifugal vortex motion is given to flow.

If in this embodiment it is not desired to give a vortex motion to one of the liquids, this deflector can be simply composed of a flat disc supported by members constituted by simple radially extending arms, while the vanes are omitted. In this construction the sleeve 10 is omitted and the screen 8 extends as far as the central pipe 20.

FIG. 4 shows another variant of the invention wherein the mechanism influencing the flow of the mixture coming from the pipe 20 is formed by a horizontal wall 25 which centrally supports the upper part of the four funnels 11, while no injection liquid is supplied.

FIG. 5 shows a variant of the apparatus according to the invention which can subterraneously be disposed. In this embodiment a separation of solids incorporated into the liquid to be treated should be achieved, while, however, a discharge of the grains on the underside is not possible. This varient shows likewise the parts 1–9, 11–14, 17 and 19. The passages 14 enable the solid particles to fall into a collecting tank 26. The deflector 19 with the blades 17 is secured around a central shaft or tube 27 which is mounted in the middle area of the part 7. The mixture to be treated is supplied via an annular channel 28 surrounding the central shaft 27. The mixture flow towards the stationary deflector with the vanes 17 formed such that a radially outward eddy flow is produced which is propagated in the entire part 7. Due to centrifugal force in the vortex field A, the liquid with the solid particles leaving the blades 17 is streaming against the peripheral wall of the part 7.

The heavy and big particles or grains fall into the eddying flow D which advances downwardly into the funnels 11. The fine and/or light particles move upwardly and pass through the openings 9 in the screen 8. So the eddying flow C is created which has a very important particularity as hereinbefore described with reference to FIG. 1. The inlined screen 6 guides a part of this flow back towards the screen 8.

A mechanical apparatus 29 of the grab type or the like moving vertically through the shaft 27 enables to pick up the grains settled in the collecting tank 26 and discharge same after having removed the water therefrom in a suitable manner. This special embodiment is advantageous in that the grains of material are discharged without disturbing the flow pattern within the basin.

FIG. 6 shows a horizontal section of the apparatus in which are visible the annular distribution channel 28, the blades 17 (shown in dotted lines) and the four outlet funnels 11 of the apparatus with their discharge passages 14.

So far the invention has been described when applied to the separation of particles with a composition or specific gravity which is distinctly different from that of the liquid, like sand in water. The invention can also be advantageously applied when floating particles should be separated in a liquid or when the normal length of time required for separation is considerably great or even infinite. In that case it is possible to introduce and auxiliary liquid through the blades 18. Such a liquid could contain a catalyst for the particles in order to cause a flocculation and a weighting and as a consequence an improved sedimenting ability. The invention can also be applied when two non-mixable liquids should be separated, in this case the light liquid passes through the area C and the heavy liquid through the area D.

In FIG. 7 a modified embodiment of the apparatus according to the FIGS. 1 and 5 is depicted, which is adapted to the treatment of a liquid like water, which does not only contain particles with a specific gravity over one, but also a polluting liquid like oil with a specific gravity below one. The members of the installation denoted by 1-9, 11, 12, 17-19, 21 and 26 correspond with those in the FIGS. 1 and 5. The screen 6 covers, however, the whole distance between the cylindrical wall of the part 1 and a central support 30. This stationary support substitutes the pipe 20 and the sleeve 10 (FIG. 1) or the central shaft 27 and the channel 28 (FIG. 5). The screen 8 is inclined and forms a cone with an apex angle of approximately 155°.

The screen 8 is supported by radial beams in the form of tubes 31 serving as supply conduits for the mixture to be treated. For that purpose the tubes 31 are connected to an annular reservoir 32 with a pipe 33, the latter communicating with the exterior. Internally the tubes 31 communicate with a connecting piece 34 toward the blades 17. In this manner the ring of blades 17 has a diameter larger than in the embodiments as represented in the FIGS. 1 and 5. The mixture to be treated is at any rate centrally introduced into the basin.

FIG. 7 shows how the centripetal flow in the area C has a marked divergent shape in order to avoid an increase of the velocity of flow. In order to permit of the polluting liquid (oil) being separated, the upper wall of the second part 5 is perforated in the annular area 35 forming the bottom of the gutter 3. A second bottom 36 is disposed at a small angle in the gutter 3. This bottom 36 does not only serve as a surface receiving the liquid flowing over the overflow edge 2, but at the same time as a ceiling for the oil passing through the area 35. In the upper region of the bottom 36 an outlet 37 with a pipe 38 is mounted. By disposing the pipe 38 in the correct position above the overflow edge 2, it is ensured that the oil gathering in the outlet 37 flows automatically off.

The four funnels 11 and the discharge passages 14 communicate via connecting pieces 39 with the common receptacle 26.

In the apparatus according to the invention the sedimentation of the materials is distinctly accelerated due to the combination of the various eddying flows, whereby as compared with other apparatus it becomes possible to obtain the same result with distinctly smaller sediment surfaces.

An efficient application of this apparatus can be established for loading in a short time floating units, like self propelling suction dredgers, barges, etc. Since it is possible to admix a certain quantity of clean water in the apparatus the advantage is obtained, in case the material to be washed and separated is contained in sea water, to decrease the salt content of the materials to be precipitated, provided the injected water is fresh water.

What we claim is:

1. An apparatus for separating particles from a liquid, comprising a basin which from top to bottom is composed of four parts provided on top of one another;

a cylindrical upper front part forming an overflow edge and surrounded by a discharge gutter;

a downwardly diverging second part;

a cylindrical third part having a cylindrical section which is greater in diameter than that of said upper part, in which a screen is accommodated dividing the third part into a portion over and a portion under the screen, the solids being able to pass through perforations of the screen, the latter having openings with enlarged diameter along its periphery, and a lower part composed of a plurality of funnels, each funnel constituting a collecting tank and having a discharge outlet for particles separated from said liquid: at least one conduit being provided for introducing the mixture to be treated, said conduit vertically extending towards the center of the third part in a zone lying below the screen and to a certain distance above a horizontal deflector, means associated with the discharge end of said at least one conduit for discharging the mixture into the basin centrifugally along a horizontal plane, while further at least one passage is provided for the discharge of the fraction, sedimented at the lower end of each outlet funnel.

2. An apparatus according to claim 1, in which a screen is accomodated in the second part of the basin said screen forming a downwardly converging zone with a larger apex angle, the axis of the cone coinciding with the axis of the cylindrical basin.

3. An apparatus according to claim 1, in which the passages on the underside of each outlet funnel open into a collecting space provided thereunder, a central shaft or tube being provided, reaching through the entire basin into the collecting space, the conduit for the introduction of the mixture to be treated being formed as an annular pipe surrounding the upper portion of the shaft, the deflector also being provided around the shaft.

4. An apparatus according to claim 1, in which the horizontal deflector delimits two regions on either side, each region consisting of a free central space and a surrounding zone provided with vanes, the supply conduit for the mixture extending towards the upper region, a pipe for clean liquid extending from below to the lower region.

5. An apparatus according to claim 4, in which the deflector with the vanes is mounted for rotation.

6. An apparatus to claim 1, in which the screen in the third part of the basin is delimited in the center by a tubular sleeve surrounding the feed pipe for the mixture to be treated, so that a passage is formed between this sleeve and the aforementioned pipe, which passage open into the free central space above the deflector.

7. An apparatus according to claim 1, in which the screen in the third part is suspended by a number of radial tubes forming the connection between the central feed of the mixture to be treated and the entering zone of this mixture at the periphery of the basin.

8. An apparatus according to claim 2, in which the bottom of the gutter is perforated, a second bottom being provided in the gutter at a slight angle with the horizontal, whilst a discharge pipe is provided for a light liquid in the highest region of the second bottom.

9. A floating craft or pontoon, comprising an apparatus according to claim 1 mounted on said craft.

* * * * *

UNITED STATES PATENT OFFICE
CERTIFICATE OF CORRECTION

PATENT NO. : 3,849,310
DATED : November 19, 1974
INVENTOR(S) : Elie Condolios and Uilke Van Essen It is certified that error appears in the above-identified patent and that said Letters Patent are hereby corrected as shown below:

(73) Assignees: N.V. Technische Maatschappij Bergmann, of Berkel en Roodenrijs, Netherlands; Societe Grenobloise D'Etudes et D'Applications Hydrauliques (Sogreah) of Grenoble-Gare, France Signed and Sealed this ninth Day of September 1975

[SEAL]

Attest:

RUTH C. MASON
Attesting Officer

C. MARSHALL DANN
Commissioner of Patents and Trademarks